(12) United States Patent
Ponnuswamy et al.

(10) Patent No.: US 11,677,551 B2
(45) Date of Patent: Jun. 13, 2023

(54) ENCRYPTION AT REST USING KMS AND TPM

(71) Applicant: EMC IP Holding Company LLC, Hopkinton, MA (US)

(72) Inventors: Senthil Ponnuswamy, San Jose, CA (US); Kalidas Balakrishnan, San Jose, CA (US); Mahadev Karadigudda, San Jose, CA (US)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 153 days.

(21) Appl. No.: 17/085,506

(22) Filed: Oct. 30, 2020

(65) Prior Publication Data

US 2022/0141013 A1 May 5, 2022

(51) Int. Cl.
*H04L 9/08* (2006.01)
*G06F 21/60* (2013.01)

(52) U.S. Cl.
CPC .......... *H04L 9/0877* (2013.01); *G06F 21/602* (2013.01); *H04L 9/0894* (2013.01)

(58) Field of Classification Search
CPC .... H04L 9/0877; H04L 9/0894; G06F 21/602
USPC .......................................................... 713/193
See application file for complete search history.

(56) References Cited

U.S. PATENT DOCUMENTS

| | | | |
|---|---|---|---|
| 2011/0276744 A1* | 11/2011 | Sengupta ............. | G11C 7/1072 711/216 |
| 2018/0351928 A1* | 12/2018 | Yoo ........................ | H04L 67/10 |
| 2020/0057859 A1* | 2/2020 | Richards ............... | H04L 9/0836 |
| 2020/0184086 A1* | 6/2020 | Bishop .................. | G06F 21/602 |
| 2020/0394317 A1* | 12/2020 | White ..................... | H04L 9/14 |
| 2021/0157904 A1* | 5/2021 | Bursell ................. | H04L 9/3242 |

* cited by examiner

*Primary Examiner* — Kambiz Zand
*Assistant Examiner* — Phuc Pham
(74) *Attorney, Agent, or Firm* — Workman Nydegger

(57) ABSTRACT

One example method includes receiving clear text data at a storage system, generating, at the storage system, a clear text data encryption key, requesting a key management system to encrypt the clear text data encryption key with a master key to create an encrypted data encryption key, and the requesting is performed by the storage system, receiving, at the storage system, the encrypted data encryption key from the key management system, encrypting, at the storage system, the clear text data with the clear text data encryption key to create encrypted data, and storing, together, the encrypted data and the encrypted data encryption key.

20 Claims, 3 Drawing Sheets

ENCRYPTION AT REST USING KMS AND TPM

FIELD OF THE INVENTION

Embodiments of the present invention generally relate to encryption of data. More particularly, at least some embodiments of the invention relate to systems, hardware, software, computer-readable media, and methods for at-rest encryption of data using, for example, a Key Manager Server (KMS) and a Trusted Platform Module (TPM).

BACKGROUND

Encryption of data can be a valuable tool, but the value stems in significant part from the particular approach used to encrypt the data, and then handle the encrypted data. One approach to data encryption might involve the use of one or more Data Encryption Keys (DEK) which are used to encrypt data and which, in turn, are encrypted themselves by a Key Encryption Key (KEK).

Some conventional approaches may store the DEKs and the KEK on the same system. However, such approaches offer little protection. If the KEK is compromised, then the entire data set can be decrypted. This is problematic if data is tiered to the cloud, since for rekeying, data would have to be read from the cloud, which costs the customer, that is, the owner of the data, both time and money. As well, if the KEK and DEKs are stored on the same system, a storage administrator could cause total data loss by removing the KEK. Finally, it might be possible to have a KMS not accessible by the storage administrator, but a requirement to access an external KMS for every read request will cause read performance bottlenecks. While read performance bottlenecks might be resolve by storing all keys in memory, such an approach leaves open the possibility of memory attacks that could result in compromised, or lost, data.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
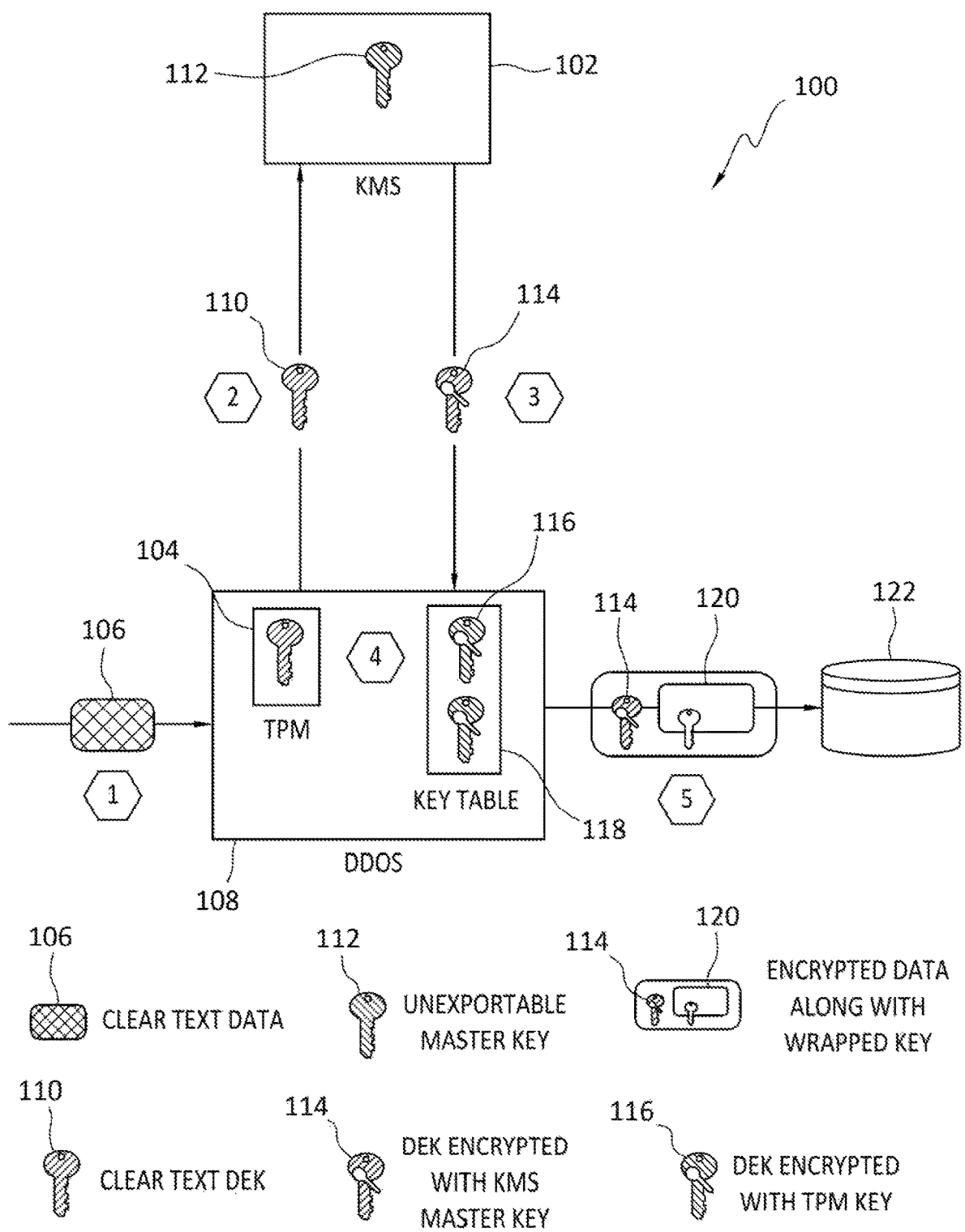
FIG. 1 discloses aspects of an example architecture and methods.

Embodiments of the present invention generally relate to encryption of data. More particularly, at least some embodiments of the invention relate to systems, hardware, software, computer-readable media, and methods for at-rest encryption of data using a Key Manager Server (KMS) and a Trusted Platform Module (TPM).

In one example embodiment, a storage system stores user data in an encrypted form. The KEK, which may also be referred to as a Master Key, for encrypting the user data is never stored in, or accessible by, the storage system. Furthermore, the DEKs are protected and cached in memory using a hardware chip, such as a TPM, that is present locally on the storage system. A KMS may be provided for protecting the Master Key, while the TPM protects the DEKs in memory on the storage system.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that a KEK is not stored in, or accessible by, a data storage system that stores data encrypted with one or more DEKs that have been encrypted by the KEK. In an embodiment, the DEKs and KEK are never both stored on the same system, so as to preserve the integrity and availability of the underlying data. In an embodiment, data is encrypted before it is stored on disks at a storage system or storage site and, as such, the data is protected from unauthorized access at the storage system or storage site.

A. Overview

In general, some example embodiments of the invention may comprise a storage system with various characteristics. Such characteristics may be, for example, that a storage system may encrypt data before storing the data on disks of the storage system, the storage system may protect the DEKs with a KEK so that the encrypted data is not compromised, and/or, the storage system may protect and preserve the data availability and integrity even if rogue storage admins or other bad actors have access to the data center.

Implementation of these characteristics may be achieved in various ways. For example, in some embodiments, the KEK may not be present on the storage system. In these example embodiments, the only device where both the DEK and KEK may co-exist concurrently may be an external KMS. The encryption and decryption of DEKs at the KMS may be protected by a Hardware Security Module (HSM) device present on the KMS.

Another way to implement one or more characteristics such as those just described may be to control the number of keys that are in plain text, that is, unencrypted, on the storage system. An LRU cache and intelligent pre-fetching may be used to determine which keys will be available in unencrypted form on the storage system, such as for possible cryptographic operations on the data.

As a final example, another approach to implementation of characteristics such as those noted above concerns the use of a TPM. Particularly, as a second tier of cache, a TPM may be used to wrap the keys to protect the keys against memory attacks.

B. Further Details of Some Example Embodiments

According to some example embodiments, DEKs may exist in various different states. Various embodiments may employ DEKs in any one or more of these states.

A first such state is a plain text LRU (Least Recently Used) cache. In general, an LRU cache may comprise a cache of plain text, that is, unencrypted, keys. In general, the least recently used keys may be deleted from the LRU cache as new keys, corresponding to new data, are added to the LRU cache. In this way, the full capacity of the LRU cache may be employed, while also ensuring that the keys in the LRU cache are kept up to date.

The use of plain text DEKs, such as keys that have not been TPM wrapped, may provide good read performance since the TPM unwrapping of encrypted keys may be obviated. As well, since the keys may be not be TPM wrapped or otherwise encrypted, there may be little or no need to perform network calls to a KMS to decrypt a DEK and thereby gain access to encrypted DEKs. In some embodiments, acceptable performance may be achieved if only about 5% of the total number of keys are in plain text and are managed using an LRU algorithm and LRU cache. Thus, in the event of a memory attack for example, only about 5% of the keys may be vulnerable and, accordingly, most of the user data, about 95% in this example, may be protected.

In some instances, the DEKs may exist in a second such in which the DEKs may have been wrapped using TPM and stored in a key table. When the system initially starts, such as prior to provisioning, the key table may be empty. The DEKs may then be added to the key table after they are wrapped using TPM. There is no limit on the number of keys in the key table and the keys may never be persisted. That is, a key may be used only once to encrypt data and never reused. The use of non-persistent keys may help to improve data security since, even were they to fall into the wrong hands, they could not be re-used to encrypt and decrypt data.

Finally, in other instances, the DEKs may exist in a state in which they have been encrypted with a KEK of a KMS and stored along with the encrypted user data. When encrypted data is stored on the disks of a storage system for example, the DEK that is used for encryption of that data may be stored along with the encrypted data after the DEK has been encrypted with the KMS key. Only the DEKs that are encrypted with KMS will be persisted, thus offering maximum protection to the data.

Advantageously, embodiments of the invention may protect data against unauthorized access and corruption by bad actors such as rogue storage administrators. To briefly illustrate, if the KEK were stored on the storage system, then a rogue administrator with access to the storage system could cause attacks, such as installing ransomware, by removing the KEK. Removal or deletion of the KEK would result in total data loss because, without the KEK, there is then no way to access the DEKs needed to decrypt the data. Thus, embodiments of the invention may be implemented in ways in which the KEK is never known to the storage system or to the storage administrator. Instead, the KEK may exist only in the KMS where its existence is unknown to the storage administrator, and the KEK in any case is inaccessible by the storage administrator or other storage system personnel and systems.

B1. Aspects of One Example Scheme

With attention now to FIG. 1, details are provided concerning an example scheme 100, components, and methods, for providing data encryption at rest using a KMS 102 and encryption hardware such as TPM chips 104. Among other things, FIG. 1 discloses an example write path and process for data ingestion, such as may occur at a storage site when the storage site receives data from one or more customers for storage at the storage site.

Initially, clear text data, that is, unencrypted data, 106 may be written, such as from a backup application for example, to a storage system 108. The storage system 108 may then generate a clear text DEK 110 and add the clear text DEK 110 to an LRU memory cache of the KMS 102. Each of the keys in the LRU memory cache may have a respective expiry time. The storage system 108 may also send a request to the KMS 102 to encrypt the DEK 110 with a KEK 112 to produce an encrypted DEK 114. The storage system 108 may then receive the encrypted DEK 114 from the KMS 102. At the storage system 108, the encrypted DEK 114 may then be wrapped using a TPM 104 chip for example, and the wrapped DEK 116 then added to a key table 118. In this example, the key table 118 may act as a second layer of cache, and the storage system 108 need not reach the KMS 102 for decryption of the wrapped DEK 116. Finally, the incoming clear text data 106 may then be encrypted using the plain text DEK 110, and the plain text DEK 110 then encrypted with the KEK 112. The data 120 that has been encrypted with the plain text DEK 110 may then be stored in storage 122 together with the encrypted DEK 114.

With continued reference to FIG. 1, details are provided concerning an example read path and process. A read may be issued, for example, by a restore server or an application. Initially, the data 120 and encrypted DEK 114 may be read out from storage 122. The process for retrieving the plain text DEK 110, which is needed to decrypt the data 120, may proceed as follows, consistent with the three different states that a DEK may exist in. Depending upon on the embodiment, fewer than all of the following processes may be performed. Whenever the plain text DEK 110 is obtained by a process, any remaining processes need not be performed. As well, the processes may be performed in any order.

In the first process, a check may be made to look for the plain text DEK 110 in the LRU memory cache of the KMS 102. The next process may involve performing a check to look for the TPM wrapped key 116 in the key table 118. In this case, the key 116 may be TPM unwrapped at the storage system 108, and the unwrapped key 114 may then be decrypted by the KMS 102 using the KEK 112. In another process, the plain text DEK 110 may be retrieved from the KMS 102.

When the plain text DEK 110 is retrieved, such as by any of the foregoing processes, the plain text DEK 110 may then be held in memory at the storage system 108 until it expires. In one example optimization, the LRU memory cache at the KMKS 102 may be pre-populated with one or more plain text DEKs in a process that may be referred to as pre-fetching. The pre-fetching process may enable faster retrieval of the plain text DEK 110 and, thus, decryption of the data 120. After the plain text DEK 110 has been retrieved, such as by one of the aforementioned processes, the data 1120 may be decrypted using the plain text DEK 110 until the read request has been completed.

B.2 Advantageous Aspects of Example Embodiments

With the example of FIG. 1 in view, it may be seen that example embodiments may provide various useful and advantageous functionalities. To illustrate, embodiments may provide for configurations that employ a KMS 102 such that, at no point in time, does the storage system 108 have access to the plain text KEK 112. This approach may prevent against data corruption and destruction by disgruntled storage administrators and security officers who could otherwise destroy the KEK 112 and thereby cause a total data loss. Note that while the data itself may not actually be destroyed by unauthorized access to the plain text KEK 112, destruction or loss of the plain text KEK 112 may prevent decryption of the data, and therefore the use of the data, since the DEKs 114 protecting the data 120 may have been encrypted with the KEK 112.

Another aspect of some embodiments is that they may eliminate the need for a round trip, call and response to the KMS 102, to obtain the KEK 112 for each read request. This may be advantageous since this round trip process will slow down, possibly significantly, the processing of the read request to obtain the requested data. Instead, by employing a local hardware-based encryption, such as TPM 104 for example, at the storage site, only a single call is needed to the KMS 102 to obtain the KEK 112, and the wrapped DEKs 116 in the secure local cache at the storage site 108 may then be unwrapped with the TPM 104 and decrypted, with the KEK 112, for use in decrypting the data needed to service the read request.

A further advantageous aspect of some embodiments concerns an optimization that may be employed. Particularly, an LRU cache may be employed at the KMS 102 for storing the plain text DEKs 110 in memory, and then pre-fetching one or more plain text DEKs 110 from the KMS 102 to maintain the key table cache 118 at the storage system 108.

B.3 Aspects of Example Cache and Pre-Fetching Processes

Figure 2:
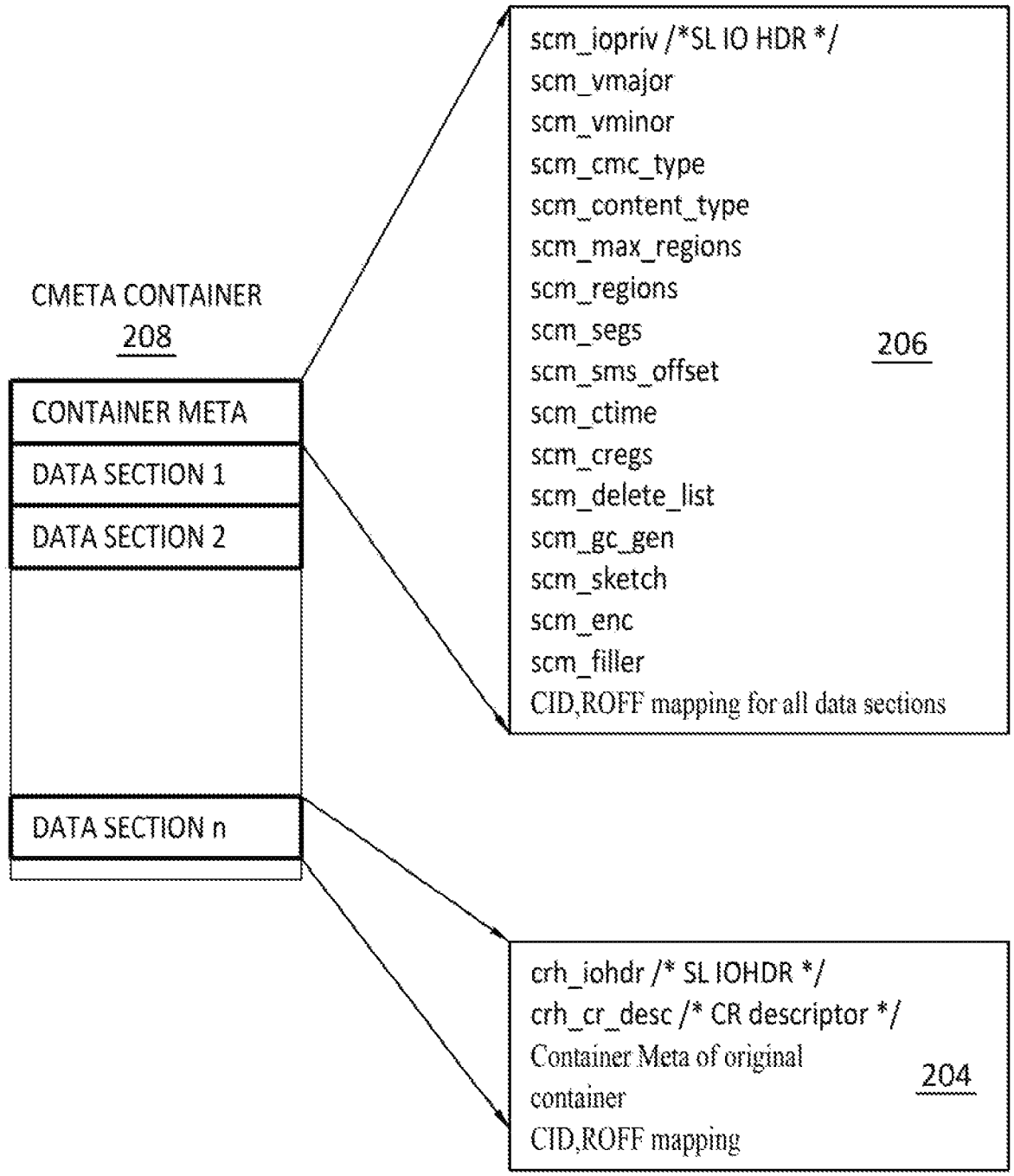
FIG. 2 discloses aspects of example containers and metadata.

Turning next to FIG. 2, and with continued reference to FIG. 1, aspects of an example pre-fetching scheme for populating an LRU cache are disclosed. In a deduplication system, with which embodiments of the invention may be employed, unique data, such as hashes or other fingerprints for example, from multiple files may be stored in a group of objects that may be referred to as containers. Each container may be internally divided into (i) a group of regions containing the unique data, or fingerprints, and (ii) container meta comprising the key index identifying the keys that were used to encrypt that unique data. As well, each of the containers may include respective metadata representing the unique fingerprints contained in the containers.

Thus, the container metadata in a container may comprise, for example, the metadata 204 representing the unique fingerprints, as well as the key index 206. This container metadata (Container-Meta, or CMETA) may be contained in a metadata container 208 and cached in SSD for faster read performance. This container metadata, which may be included in an associated container, may thus comprise a collection of all the data container metadata for quick reference.

Note that in some embodiments at least, the container metadata does not include any of the keys, but only an index to the keys, which are stored elsewhere. In some embodiments, each key corresponds to a particular region of data in the container.

With respect to the caching of container metadata, various approaches may be employed. In one approach, the key index may be stored in the metadata container, since the key index may span multiple containers and, potentially, each region in a container may be encrypted with a different respective key. The container metadata may have the key index space represented by the regions, and the metadata container may have the key-index space represented by the individual containers, such that the key-index space of the metadata containers may span multiple different containers. Once the metadata container is updated with the key-index space, then the keys in that key-index space may constitute the hot keys that need to be decrypted, such as by a KEK, for reading the data that was encrypted with the keys.

In another approach to the caching of container metadata, the key range to which the cached container metadata refers may be stored so that the respective data associated with the keys in the key range can be decrypted on demand. The system data may be encrypted with thousands of keys and this cache may represent the 'hot' data that is being read out, such as for a restore process. Thus, it may not be necessary for all of the keys to be in memory. Instead, only a minimal subset of keys, that is, the keys that correspond to the 'hot,' or most recently used, data may need to be in memory. The key range may thus be limited to the cache size and represented as LRU, so that when new hot data comes in, the cold data and its respective keys are evicted, hence maintaining a constant set of keys in the LRU cache. In some embodiments, the hot keys, or keys corresponding to the hot data, may represent a contiguous set of containers due to the SISL (Stream Informed Storage Layer) architecture of a file system.

With continued reference to the example of FIG. 2, details are provided concerning some example pre-fetching processes in which one or more keys are fetched, such as from an LRU cache of a KMS, prior to the time that that the data encrypted with those keys is actually requested in a read operation. For example, during startup of a filesystem, the filesystem may populate as much of the TPM and LRU cache as possible. In some embodiments, this may be at least 25% of the key table size and, particularly, the bottom quarter of the key table as those are the most recent keys used on the write path.

At every cache miss, depending on key rotation frequency, a certain amount, such as a month worth, of keys may be prefetched. That is, when a read operation is being processed, and a request for the keys corresponding to data of the read request results in a finding that the cache does not include the needed key, a certain number or amount of keys may then be pre-fetched in response, to avoid future cache misses for that read operation and/or other read operations. Reading keys from the cache, rather than from memory may be relatively more desirable due to the relatively faster performance of the cache in returning requested keys.

That is, in some embodiments, during a read operation, the metadata may be read from the cache. If there is a cache miss, then the metadata is read from the disk, but the key index space for the metadata read is not in memory. Since this metadata represents a wide range of data and the key-index space is available in the metadata, the first miss will result in performance of a read-ahead of the next set of metadata container and collection of the key-index space. This larger key-index space may be decrypted in a bulk key conversion at the KMS. During write, the subsequent metadata containers generated may represent the entire backup/data since the stream of data is written as contiguous immutable containers and its metadata. So, a pre-fetch of key-index space may be a very close match to the data being restored. The key-index space needs to be tuned to the average locality of the data.

In a data deduplication system, a garbage collection process may change the locality of data, and subsequent metadata containers may not represent the contiguous data. To solve this problem, while a garbage collection process may copy-forward any live data, the garbage collection process may have to sort the containers with the same key-space into a single metadata container. Each batch of data copy-forwarded may have to sub-batch the live data with a specific key-space and write it down, thus avoiding eviction of any hot-keys. This method may significantly improve performance of a pre-fetch algorithm, such as that described above.

B.4 Example Terms

Various terms have been employed in the present disclosure. Following are definitions for selected terms. DEK refers to 'Data Encryption Key. KEK refers to 'Key Encryption Key' or a 'Master Key.' KMS refers to a Key Management Server external to the storage site, and which may use an HSM (Hardware Security Module) to protect the private keys, and to perform encryption and decryption routines. Wrapping refers to performance of an encryption process with respect to a key or other data, such as by using a TPM RSA private key to perform the encryption. Finally, TPM refers to a hardware chip and/or system that is operable to perform RSA encryption and decryption without the master key (KEK) leaving the TPM chip. That is, the KEK remains at the TMP chip and is not transferred, or copied, elsewhere. Note that while reference is made to RSA encryption and decryption, the scope of the invention is not so limited, and other encryption and/or decryption processes may alternatively be employed in some embodiments.

It is further noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

Finally, it is noted with respect to the example methods discussed in connection with FIG. 1, any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

C. Further Example Embodiments

Following are some further example embodiments of the invention. These are presented only by way of example and are not intended to limit the scope of the invention in any way.

Embodiment 1. A method, comprising: receiving clear text data at a storage system; generating, at the storage system, a clear text data encryption key; requesting a key management system to encrypt the clear text data encryption key with a master key to create an encrypted data encryption key, and the requesting is performed by the storage system; receiving, at the storage system, the encrypted data encryption key from the key management system; encrypting, at the storage system, the clear text data with the clear text data encryption key to create encrypted data; and storing, together, the encrypted data and the encrypted data encryption key.

Embodiment 2. The method as recited in embodiment 1, wherein the master key is an unexportable key that is stored only at the key management system and not at the storage system.

Embodiment 3. The method as recited in any of embodiments 1-2, further comprising using a TPM chip to wrap the encrypted data encryption key received from the key management system to create a TPM wrapped key.

Embodiment 4. The method as recited in embodiment 3, further comprising storing the TPM wrapped key in a key table at the storage system.

Embodiment 5. The method as recited in any of embodiments 1-4, further comprising receiving a read request at the storage system and, in response to receipt of the read request, reading out, at the storage system, the encrypted data and the encrypted data encryption key.

Embodiment 6. The method as recited in any of embodiments 1-5r, further comprising obtaining the plain text data encryption key which was used to create the encrypted data encryption key, and decrypting the encrypted data with the plain text data encryption key.

Embodiment 7. The method as recited in embodiment 6, wherein obtaining the plain text data encryption key comprises one of: obtaining, from memory of the storage system, the plain text data encryption key; unwrapping a TPM wrapped key stored in a key table at the storage system, transmitting the resulting unwrapped key to the key management system and, receiving from the key management system, the plain text data encryption key; or obtaining, from an LRU memory cache of the key management system, the plain text data encryption key.

Embodiment 8. The method as recited in any of embodiments 1-7, further comprising performing a pre-fetch process to gather metadata relating to one or more containers and/or metadata relating to one or more keys, and populating an LRU cache at the key management system with the pre-fetched metadata.

Embodiment 9. The method as recited in embodiment 8, wherein the pre-fetched metadata is read out from an LRU cache and/or from a TPM cache.

Embodiment 10. The method as recited in embodiment 8, wherein the storage system is operable to perform deduplication on the clear text data, and a garbage collection process avoids eviction of hot keys from the LRU memory cache by copying forward a batch of live data and sub-batching the live data together with a key-space specific to the batch of data.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
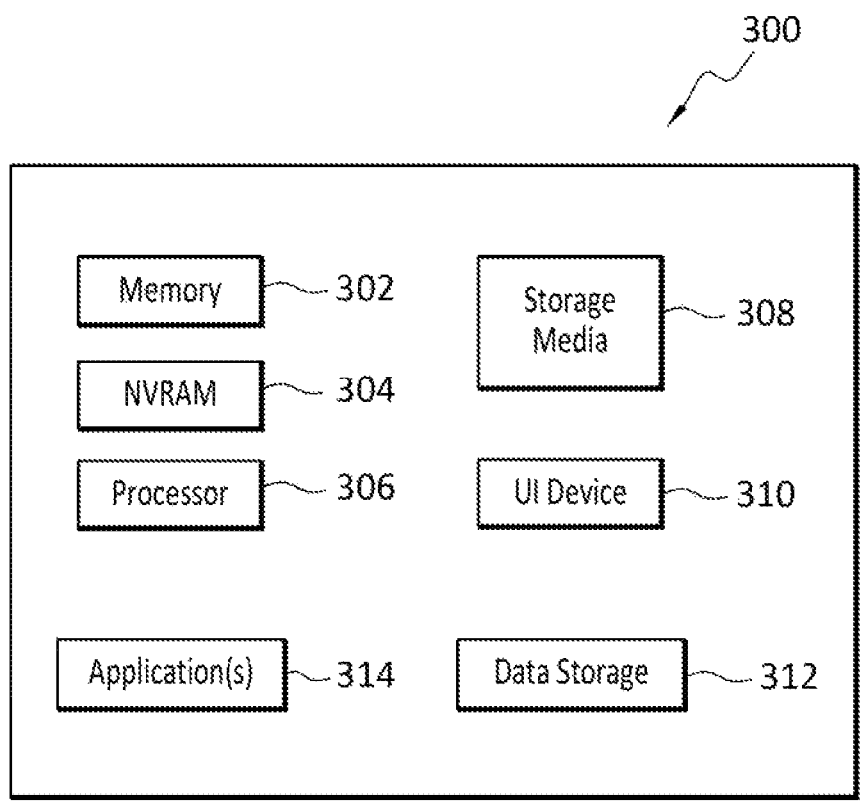
FIG. 3 discloses aspects of an example computing entity operable to perform the disclosed methods and processes.

With reference briefly now to FIG. 3, any one or more of the entities disclosed, or implied, by FIGS. 1-2 and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 302 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
  receiving clear text data at a storage system;
  generating, at the storage system, which is separate from a key management system, a plain text data encryption key;
  sending, by the storage system, the plain text data encryption key to the key management system to enable the key management system to encrypt the plain text data encryption key with a master key, wherein the master key is located in the key management system, to create an encrypted data encryption key;

receiving, at the storage system, the encrypted data encryption key from the key management system;

encrypting, at the storage system, the clear text data with the encrypted data encryption key to create encrypted data; and storing, together, the encrypted data and the encrypted data encryption key in the storage system.

2. The method as recited in claim 1, wherein the master key is an unexportable key that is stored only at the key management system and not at the storage system.

3. The method as recited in claim 1, further comprising using a Trusted Platform Module (TPM) chip to wrap the encrypted data encryption key received from the key management system to create a TPM wrapped key.

4. The method as recited in claim 3, further comprising storing the TPM wrapped key in a key table at the storage system.

5. The method as recited in claim 1, further comprising receiving a read request at the storage system and, in response to receipt of the read request, reading out, at the storage system, the encrypted data and the encrypted data encryption key.

6. The method as recited in claim 5, further comprising obtaining the plain text data encryption key which was used to create the encrypted data encryption key, and decrypting the encrypted data with the plain text data encryption key.

7. The method as recited in claim 6, wherein obtaining the plain text data encryption key comprises one of:
obtaining, from memory of the storage system, the plain text data encryption key;
unwrapping a Trusted Platform Module (TPM) wrapped key stored in a key table at the storage system, transmitting the resulting unwrapped key to the key management system and, receiving from the key management system, the plain text data encryption key; or
obtaining, from a Least Recently Used (LRU) memory cache of the key management system, the plain text data encryption key.

8. The method as recited in claim 1, further comprising performing a pre-fetch process to gather metadata relating to one or more containers and/or metadata relating to one or more keys, and populating a Least Recently Used (LRU) memory cache at the key management system with the pre-fetched metadata.

9. The method as recited in claim 8, wherein the pre-fetched metadata is read out from the LRU memory cache and/or from a Trusted Platform Module (TPM) cache.

10. The method as recited in claim 8, wherein the storage system is operable to perform deduplication on the clear text data, and to perform a garbage collection process to avoid eviction of hot keys from the LRU memory cache by copying forward a batch of live data and sub-batching the live data together with a key-space specific to the batch of data.

11. A non-transitory storage medium having stored therein instructions that are executable by one or more hardware processors to perform operations comprising:
receiving clear text data at a storage system;
generating, at the storage system, which is separate from a key management system, a plain text data encryption key;
sending, by the storage system, the plain text data encryption key to the key management system to enable the key management system to encrypt the plain text data encryption key with a master key, wherein the master key is located in the key management system, to create an encrypted data encryption key;
receiving, at the storage system, the encrypted data encryption key from the key management system;
encrypting, at the storage system, the clear text data with the encrypted data encryption key to create encrypted data; and
storing, together, the encrypted data and the encrypted data encryption key in the storage system.

12. The non-transitory storage medium as recited in claim 11, wherein the master key is an unexportable key that is stored only at the key management system and not at the storage system.

13. The non-transitory storage medium as recited in claim 11, wherein the operations further comprise using a Trusted Platform Module (TPM) chip to wrap the encrypted data encryption key received from the key management system to create a TPM wrapped key.

14. The non-transitory storage medium as recited in claim 13, wherein the operations further comprise storing the TPM wrapped key in a key table at the storage system.

15. The non-transitory storage medium as recited in claim 11, wherein the operations further comprise receiving a read request at the storage system and, in response to receipt of the read request, reading out, at the storage system, the encrypted data and the encrypted data encryption key.

16. The non-transitory storage medium as recited in claim 15, wherein the operations further comprise obtaining the plain text data encryption key which was used to create the encrypted data encryption key, and decrypting the encrypted data with the plain text data encryption key.

17. The non-transitory storage medium as recited in claim 16, wherein obtaining the plain text data encryption key comprises one of:
obtaining, from memory of the storage system, the plain text data encryption key;
unwrapping a Trusted Platform Module (TPM) wrapped key stored in a key table at the storage system, transmitting the resulting unwrapped key to the key management system and, receiving from the key management system, the plain text data encryption key; or
obtaining, from a Least Recently Used (LRU) memory cache of the key management system, the plain text data encryption key.

18. The non-transitory storage medium as recited in claim 11, wherein the operations further comprise performing a pre-fetch process to gather metadata relating to one or more containers and/or metadata relating to one or more keys, and populating a Least Recently Used (LRU) memory cache at the key management system with the pre-fetched metadata.

19. The non-transitory storage medium as recited in claim 18, wherein the pre-fetched metadata is read out from the LRU memory cache and/or from a Trusted Platform Module (TPM) cache.

20. The non-transitory storage medium as recited in claim 18, wherein the operations further comprise performing deduplication on the clear text data, and performing a garbage collection process to avoid eviction of hot keys from the LRU memory cache by copying forward a batch of live data and sub-batching the live data together with a key-space specific to the batch of data.

* * * * *